US008898583B2

(12) United States Patent
Bhola et al.

(10) Patent No.: US 8,898,583 B2
(45) Date of Patent: Nov. 25, 2014

(54) SYSTEMS AND METHODS FOR PROVIDING INFORMATION REGARDING SEMANTIC ENTITIES INCLUDED IN A PAGE OF CONTENT

(75) Inventors: Carlos Bhola, New York, NY (US);
Ludovic Cabre, New York, NY (US);
Gerald Kropitz, New York, NY (US);
Brian Rogers, New York, NY (US)

(73) Assignee: Kikin Inc., New York, NY (US)

( * ) Notice: Subject to any disclaimer, the term of this patent is extended or adjusted under 35 U.S.C. 154(b) by 187 days.

(21) Appl. No.: 13/229,245

(22) Filed: Sep. 9, 2011

(65) Prior Publication Data
US 2013/0031500 A1 Jan. 31, 2013

Related U.S. Application Data

(60) Provisional application No. 61/512,826, filed on Jul. 28, 2011.

(51) Int. Cl.
*G06F 3/048* (2013.01)

(52) U.S. Cl.
USPC ........... 715/769; 715/863; 715/822; 715/764; 715/760

(58) Field of Classification Search
USPC .......................... 715/769, 863, 822, 764, 760
See application file for complete search history.

(56) References Cited

U.S. PATENT DOCUMENTS

| 7,933,896 B2 | 4/2011 | Dexter |
| 2002/0194166 A1 | 12/2002 | Fowler |
| 2005/0091576 A1* | 4/2005 | Relyea et al. ................. 715/502 |
| 2007/0005576 A1 | 1/2007 | Cutrell et al. |
| 2007/0185835 A1 | 8/2007 | Ursitti et al. |
| 2007/0233692 A1 | 10/2007 | Lisa et al. |
| 2008/0065685 A1 | 3/2008 | Frank |
| 2008/0122796 A1* | 5/2008 | Jobs et al. ..................... 345/173 |
| 2008/0140619 A1* | 6/2008 | Srivastava et al. ................ 707/3 |
| 2009/0144609 A1 | 6/2009 | Liang et al. |
| 2009/0157611 A1 | 6/2009 | Kipersztok |
| 2010/0017289 A1 | 1/2010 | Sah et al. |
| 2010/0228710 A1 | 9/2010 | Imig et al. |
| 2011/0077936 A1 | 3/2011 | Arumugam et al. |
| 2011/0196852 A1 | 8/2011 | Srikanth et al. |
| 2011/0225155 A1* | 9/2011 | Roulland et al. .............. 707/737 |
| 2012/0117082 A1* | 5/2012 | Koperda et al. ............... 707/748 |

OTHER PUBLICATIONS

International Search Report on PCT/US2012/034476 dated Nov. 23, 2012.
International Search Report on PCT/US2012/047676 dated Jan. 10, 2013.
Office Action on U.S. Appl. No. 13/229,302 dated Mar. 27, 2013.
Office Action on U.S. Appl. No. 13/229,311 dated Dec. 26, 2012.
Office Action on U.S. Appl. No. 13/554,779 dated Jan. 8, 2013.
Written Opinion on PCT/US2012/034476 dated Nov. 23, 2012.
Written Opinion on PCT/US2012/047676 dated Jan. 10, 2013.
Office Action on U.S. Appl. No. 13/229,311 dated Jan. 3, 2014.
Office Action on U.S. Appl. No. 13/554,779 dated Oct. 23, 2013.

\* cited by examiner

*Primary Examiner* — Weilun Lo
*Assistant Examiner* — Peiyong Weng
(74) *Attorney, Agent, or Firm* — Foley & Lardner LLP; John D. Lanza

(57) ABSTRACT

A method for providing contextual information regarding semantic entities included in a page of content, includes the steps of: displaying to a user a page of content including one or more semantic entities; identifying the included one or more semantic entities; and receiving input from the user indicating a desire to receive contextual information regarding a specific one of the identified semantic entities.

20 Claims, 16 Drawing Sheets

Fig. 3A

```
{ "user": {
  "history":"c35db84500755140261568e203630c65ff79b6ae5137338091c0a2d29ee807ef8e460eb2756f40308e09063234f6f3d
4",
  "saves":"70a6c10c3840800fbe5218227e5e2cefaaffe22a874353cdf434a34450ddbcc2a7b9c5e4d956e20dce0f8ac1e912f961"
  "favorites":{
    "car": {strength: 0.7, freshness: 0.3, lastEngagement:"2011-07-17T21:41:00.000z"},
    "travel": {strength: 0.1, freshness: 0.5, lastEngagement:"2011-07-15T12:45:12.00cz"},
    "enterainment": {strength: 0.2, freshness: 0.7, lastEngagement:"2011-07-19T9:21:52.00oz"}
  },
  'pr'orsearches': ["browser plug'n", "larry allen", "kikir"],
},
"page": {
  "wordfreqvec":
"44057da3517c158cc38d550b1ee94cf1164ea857f6be599ee1fb989c229fc1c817aaebfdc19ce2cf40d290ca92f46599"
}
}
```

*Fig. 6*

◎kikin™  ABOUT US | CONTACT US | FEATURES | PRESS | JOBS | BLOG

Contact Us

Please tell us a bit about who you are and how we can help, and we'll make sure the right member of the kikin team gets in touch with you.

Name
First  Last

Company

Title

Email \*

Phone Number
###  ####

Web Site

Your message

How did you hear about kikin?

[Submit]

kikin Headquarters
132 Crosby Street, 4th Floor
New York, NY 10012
646-395-1280
info @ kikin.com

Tech Support:
support@kikin.com

Advertising Inquiry:
partner@kikin.com
Partner with kikin

Press/Media Contact:
Larry Allen
larry@kikin.com

*Fig. 7A*

/query-server-beta/K/Query/?resultDataType=JSON&layout=default&1=8&
returnType=javascript&ul=en-US&ksu=http%3A%2F%2Fkikin.com%2F
contact&extract=%7B%22mode%22%3A%22HIGHLIGHT%22%2C%22da
ta%22%3A%7B%22hl%22%3A%22132%20Crosby%20Street%2C%204th%
20Floor%20New%20York%2C%20NY%2010012%22%2C%22prchl%22%
3A%22kikin%20Headquarters%22%2C%22posthl%22%3A%22%20646-395-
1280%20in%22%2C%22tag%22%3A%22P%22%2C%22title%22%3A%22
kikin%22%2C%22hl%22%3A%22kikin%22%2C%22h2%22%3A%22Contact
%20Us%22%2C%22keywords%22%3A%22kikin%2C%20facebook%2C%20
twitter%2C%20social%20networking%2C%20price%20comparison%2C%20
browser%20plugin%22%7D%7D

*Fig. 7B*

```
{
  "query":"132 crosby street, 4th Floor New York, NY 10012",
  "user" : {
    "location" : { "countryCode":"US","ipAddress":"69.193.216.26",
      "countryName":"United States", "regionName":"New York",
      "city":"New York","dmaCode":"501","region":"NY","areaCode":"212",
      "postalCode":"10012","continentCode":"NA",
      "coordinanes" : {
        "latitude" : -73.9981
      }
    }
  },
  "pluginversion":"null qub.us-beta",
  "results" : {
    "kikin.partner.bing.maps" : {
      "nextOffset" : 1,"maxResults" : 1,
      "limit" : 8,
      "items" : [ {
        "location" : [ {
          "type":"Address",
          "latitude" : -73.996628
        } [,
        "type":"Location","title":"132 Crosby St. New York, NY 10012-3351"
        } ],
        "partnerCategory" : "MAP"
    },
    "kikin.partner.sitepreview.nyc.gov" : {
      "nextOffset" : 1,
      "maxResults" : 1,
      "limit" : 8,
      "items" : [ {
        "properties" : [ {
          "value":"www.nyc.gov/ntml/film/ntml/discounts/props.shtml", "key":"display_url"
        } ],
        "type":"web", "url":"http://www.nyc.gov/html/film/html/discounts/props.shtml",
        "title":"NYC.gov - Mayor's office of Film, Theatre & Broadcasting...",
        "ids" : {
          "primaryId":"5"
        },
        "dates" : {
          "indexTime" : "2011-07-16T00:36:00.000Z"
        },
        "descriptions" : {
          "complete":"132 Franklin Avenue, Brooklin, NY ... 620 West 26th Steet, 4th Floor, New York, NY 10001. ...
          "summary":"www.nyc.gov/html/film/html/discounts/props.shtml"
        }
      } ],
      "partnerCategory" : "ANY"
    },
  },
  "popupScriptUrl":"http://kbp.de.kikin.com/wbp-data/js/kikin-barPopup-deta.js",
  "meta" : {
    "namedEntities" : ["New York City" ],
    "locations" : ["new york ny 10012" ],
    "blacklisted" : true
  },
  "requestId":"n58Iknv.3q2um6.1onI2a","hostId":"unknown",
  "callbackUrl":"http://kikin.com/contact","serverRevision":"23297"
```

*Fig. 7C*

SYSTEMS AND METHODS FOR PROVIDING INFORMATION REGARDING SEMANTIC ENTITIES INCLUDED IN A PAGE OF CONTENT

RELATED APPLICATION

This present application claims the benefit of and priority to U.S. Provisional Patent Application No. 61/512,826, entitled "SYSTEMS AND METHODS FOR CONTEXTUAL PERSONALIZED SEARCHING," filed on Jul. 28, 2011, which is incorporated by reference in its entirety.

FIELD OF THE INVENTION

Embodiments of the present invention relate generally to the field of searching the internet and other content sources (including, but not limited to, advertising streams) and computerized searching. In particular, the systems and methods described herein allow traditional web content to be consumed in a radically different manner based on characteristics of the consumer.

SUMMARY OF THE INVENTION

In one aspect, the present invention relates to a method for providing contextual information regarding semantic entities included in a page of content. A page of content including one or more semantic entities is displayed to a user. One or more of semantic entities included in the page is identified. Input is received from the user indicating a desire to receive contextual information regarding a specific one of the identified semantic entities.

In another aspect, the present invention relates to a system providing contextual information regarding semantic entities included in a page of content. The system includes means for displaying to a user a page of content including one or more semantic entities, means for identifying one or more of semantic entities included in the page, and means for receiving input from the user indicating a desire to receive contextual information regarding a specific one of the identified semantic entities.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3A is an exemplary view of a screen shot showing a webpage before contextual mode has been activated, according to an embodiment of the present invention;

FIG. 6 is a textual representation of a data structure containing information regarding a sample user profile, according to an embodiment of the present invention;

FIG. 7A is an exemplary view of a screen shot showing a webpage in which a user has highlighted a search entity;

FIG. 7B is a sample rich-query string based on the search entity and webpage of FIG. 7A, according to an embodiment of the present invention; and FIG. 7C is a textual representation of a data structure containing a sample text search result returned by a server that had been provided the rich-query string of FIG. 7B, according to an embodiment of the present invention.

DETAILED DESCRIPTION OF THE INVENTION

Various embodiments of the present invention provide a process or system for conducting a contextual search. A user views a webpage, a document, or other content. According to some embodiments, the contextual search service accepts input from the user regarding one or more search terms, phrases, images, or other information indicating a topic or topics of interest (hereinafter referred to as a "search entity"). According to some embodiments, anything and everything in a document is searchable. According to various embodiments, the service selects additional input related to the search entity to determine the context of the search entity, in order to conduct a search that is more likely to be relevant than a search that does not involve the context. According to various further embodiments, the service uses the search entity and context that may be related to the search entity to search for and obtain search results. According to various embodiments, these results are presented to the user.

Figure 1A:
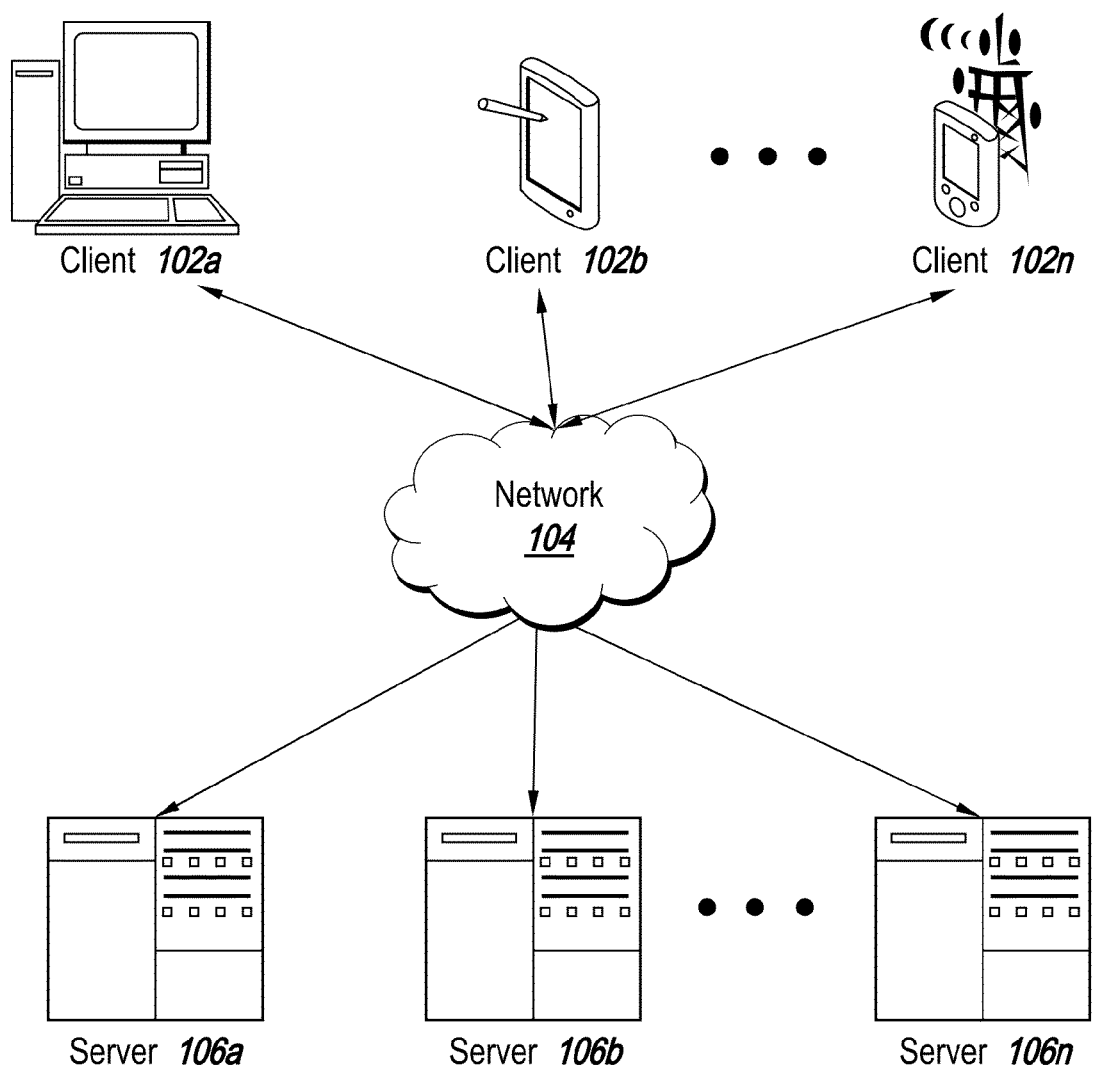
FIG. 1A is a schematic diagram of a system in accordance with an embodiment of the present invention.

FIG. 1A illustrates a networked environment 101 according to some embodiments, in which a contextual search service is provided. As shown in FIG. 1A, the networked environment 101 includes one or more client machines 102A-102N (generally referred to herein as "client machine(s) 102" or "client(s) 102") in communication with one or more servers 106A-106N (generally referred to herein as "server machine(s) 106" or "server(s) 106") over a network 104. The client machine(s) 102 can, in some embodiments, be referred to as a single client machine 102 or a single group of client machines 102, while server(s) 106 may be referred to as a single server 106 or a single group of servers 106. Although three client machines 102 and three server machines 106 are depicted in FIG. 1A, any number of clients 102 can be in communication with any number of servers 106. In some embodiments, a single client machine 102 communicates with more than one server 106, while in another embodiment a single server 106 communicates with more than one client machine 102. In yet another embodiment, a single client machine 102 communicates with a single server 106. Further, although a single network 104 is shown connecting client machines 102 to server machines 106, it should be understood that according to some embodiments, multiple, separate networks connect a subset of client machines 102 to a subset of server machines 106.

In some embodiments, the computing environment 101 includes an appliance (not shown in FIG. 1A) installed between the server(s) 106 and client machine(s) 102. This appliance can mange client/server connections, and in some cases can load balance connections made by client machines 102 to server machines 106. Suitable appliances are manufactured by any one of the following companies (but are not limited to these companies): the Citrix Systems Inc. Application Networking Group; Silver Peak Systems, Inc, both of Santa Clara, Calif.; Riverbed Technology, Inc. of San Francisco, Calif.; F5 Networks, Inc. of Seattle, Wash.; or Juniper Networks, Inc. of Sunnyvale, Calif.

Figure 1B:
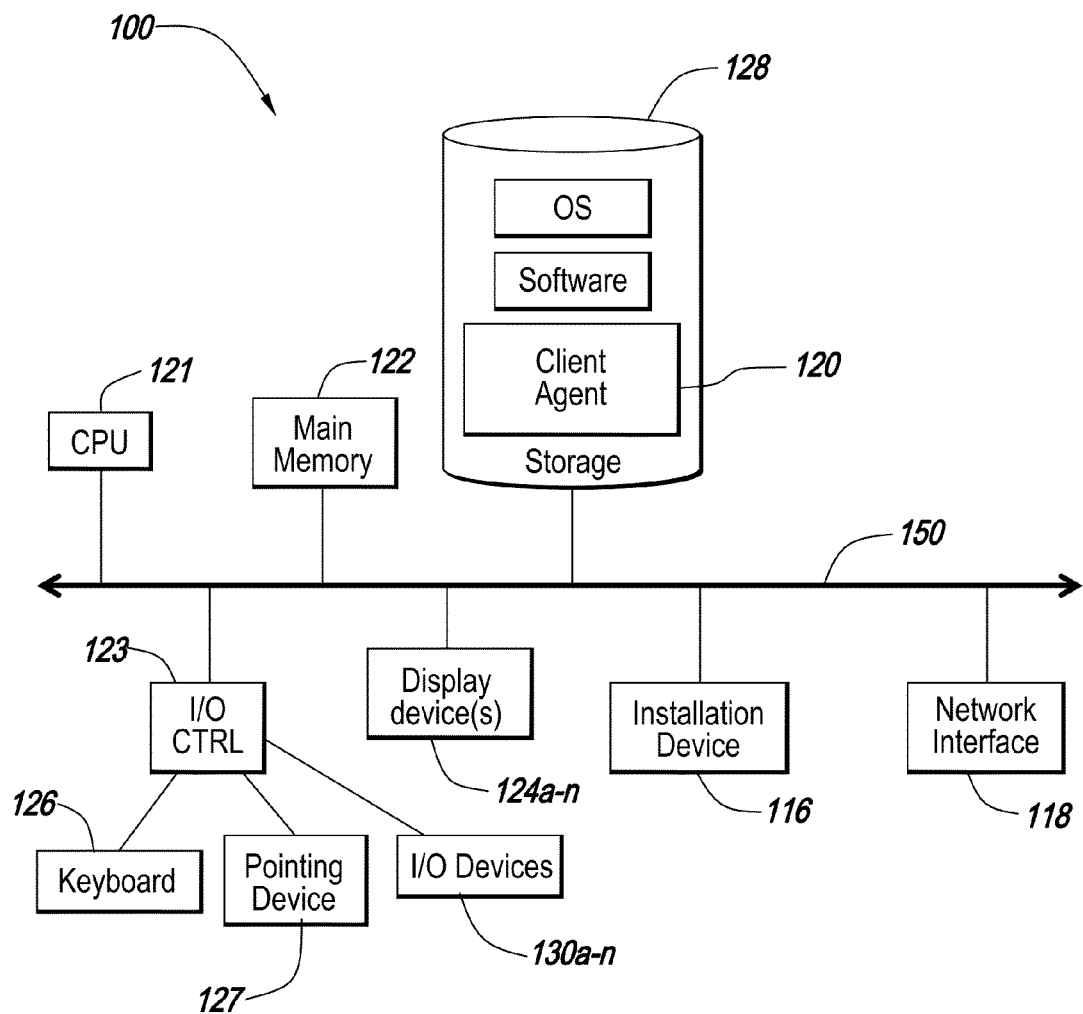
FIG. 1B is a exploded diagram of the apparatus of FIG. 1, in accordance with an embodiment of the present invention.

Client(s) 102 and server(s) 106 may be provided as a computing device 100, a specific embodiment of which is illustrated in FIG. 1B. Included within the computing device 100 is a system bus 150 that communicates with the following components: a central processing unit 121 ("processor"); a main memory 122 providing non-transient storage; storage memory 128 providing non-transient storage; an input/output (I/O) controller 123; display devices 124A-124N; an installation device 116; and a network interface 118. In some embodiments, the storage memory 128 includes: an operating system, software routines, and a client agent 120. The I/O controller 123, in some embodiments, is further connected one or more input devices. Volatile computer memory, non-volatile computer memory, and combinations of volatile and non-volatile computer memory are to be included within the scope of non-transient storage. As shown in FIG. 1B, the I/O controller 123 is connected to a camera 125, a keyboard 126, a pointing device 127 such as (but not limited to) a mouse, and a microphone 129.

Various embodiments of the computing machine 100 include a central processing unit 121 characterized by any one of the following component configurations: logic circuits that respond to and process instructions fetched from the main memory unit 122; a microprocessor unit, such as (but not limited to): those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 include any one or combination of the following: a microprocessor, a microcontroller, a central processing unit with a single processing core, a central processing unit with two processing cores, or a central processing unit with more than one processing core.

While FIG. 1B illustrates a computing device 100 that includes a single central processing unit 121, in some embodiments the computing device 100 include one or more processing units 121. In these embodiments, the computing device 100 can store and execute firmware or other executable instructions that, when executed, direct the one or more processing units 121 to simultaneously execute instructions or to simultaneously execute instructions on a single piece of data. In other embodiments, the computing device 100 store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 includes one or more processing cores. For example, according to some embodiments the processing unit 121 has two cores, four cores, eight cores, or any number of cores. In some embodiments, the processing unit 121 comprises one or more parallel processing cores. The processing cores of the processing unit 121, in some embodiments, access available memory as a global address space, or in other embodiments, memory within the computing device 100 is segmented and assigned to a particular core within the processing unit 121. In some embodiments, the one or more processing cores or processors in the computing device 100 can each access local memory. In still other embodiments, memory within the computing device 100 is shared amongst one or more processors or processing cores, while other memory can be accessed by particular processors or subsets of processors. In embodiments where the computing device 100 includes more than one processing unit, the multiple processing units are included in a single integrated circuit (IC). These multiple processors, in some embodiments, are linked together by an internal high speed bus, which may be referred to as an element interconnect bus.

In embodiments where the computing device 100 includes one or more processing units 121, or a processing unit 121 including one or more processing cores, the processors, in some embodiments, can execute a single instruction simultaneously on multiple pieces of data (SIMD), or in other embodiments can execute multiple instructions simultaneously on multiple pieces of data (MIMD). In some embodiments, the computing device 100 includes any number of SIMD and MIMD processors.

The computing device 100, in some embodiments, includes a graphics processor or a graphics processing unit (not shown). In various embodiments, the graphics processing unit includes any combination of software and hardware, and can further input graphics data and graphics instructions, render a graphic from the inputted data and instructions, and output the rendered graphic. In some embodiments, the graphics processing unit is included within the processing unit 121. In other embodiments, the computing device 100 includes one or more processing units 121, such that at least one processing unit 121 is dedicated to processing and rendering graphics.

Some embodiments of the computing device 100 provide support for any one of the following installation devices 116 (but is not limited to these devices): a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications, in some embodiments, include a client agent 120, or any portion of a client agent 120. According to some embodiments, the computing device 100 further includes a storage device 128 that is either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Embodiments of the computing device 100 include any one of the following I/O devices 130A-130N (but is not limited to these examples): a camera 125, keyboard 126; a pointing device 127; a microphone 129; mice; trackpads; an optical pen; trackballs; microphones; drawing tablets; video displays; speakers; inkjet printers; laser printers; and dye-sublimation printers; touch screen; or any other input/output device able to perform the methods and systems described herein. According to some embodiments, an I/O controller 123 connects to multiple I/O devices 103A-130N to control the one or more I/O devices. According to some embodiments, the I/O devices 130A-130N are configured to provide storage or an installation medium 116. According to other embodiments, the I/O devices 130A-130N are configured to provide a universal serial bus (USB) interface for receiving USB storage devices such as (but not limited to) the USB Flash Drive line of devices manufactured by Twintech Industry, Inc. Still other embodiments include an I/O device 130 that is a bridge between the system bus 150 and an external communication bus, such as (but not limited to): a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; WINDOWS VISTA; and WINDOWS 7; the different releases of the Unix and Linux operating systems; any version of the MAC OS or iOS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

In various embodiments, the computing machine 100 is embodied in any one of the following computing devices (but is not limited to these devices): a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein.

In other embodiments, the computing machine 100 is a mobile device such as (but not limited to) any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 is any one of the following mobile computing devices (but is not limited to these devices): any one series of Blackberry, or other handheld device manufactured by Research In Motion Limited; the iPhone manufactured by Apple Computer; Palm Pre; a Pocket PC; a Pocket PC Phone; or any other handheld mobile device. In yet still other embodiments, the computing device 100 is a smart phone or tablet computer, such as (but not limited to) the iPhone or iPad manufactured by Apple, Inc. of Cupertino, Calif.; the BlackBerry devices manufactured by Research in Motion, Ltd. of Waterloo, Ontario, Canada; Windows Mobile devices manufactured by Microsoft Corp., of Redmond, Wash.; the Xoom manufactured by Motorola, Inc. of Libertyville, Ill.; devices capable of running the Android platform provided by Google, Inc. of Mountain View, Calif.; or any other type and form of portable computing device.

In still other embodiments, the computing device 100 is a virtual machine. In some embodiments, the virtual machine is any virtual machine, such as (but not limited to) those managed by a hypervisor developed by XenSolutions, Citrix Systems, IBM, VMware, or any other hypervisor. In still other embodiments, the virtual machine is managed by a hypervisor executing on a server 106 or a hypervisor executing on a client 102.

In still other embodiments, the computing device 100 can execute, operate or otherwise provide an application that is any one of the following: software; an application or program; executable instructions; a virtual machine; a hypervisor; a web browser; a web-based client; a client-server application; an ActiveX control; a Java applet; software related to voice over internet protocol (VoIP) communications like a soft IP telephone; an application for streaming video and/or audio or receiving and playing streamed video and/or audio; an application for facilitating real-time-data communications; a HTTP client; a FTP client; or any other set of executable instructions. Still other embodiments include a client device 102 that displays application output generated by an application remotely executing on a server 106 or other remotely located machine. In these embodiments, the client device 102 can display the application output in an application window, a browser, or other output window.

According to various embodiments, the computing device 100 further includes a network interface 118 to interface to a Local Area Network (LAN), Wide Area Network (WAN), the Internet, or any type of network, through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). In some embodiments, the network 104 comprises one or more sub-networks, and is installed between any combination of the clients 102, servers 106, computing machines and appliances included within the computing environment 101. In some embodiments, the network 104 is: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. According to some embodiments, the network topology of the network 104 differs within different embodiments, possible network topologies include: a bus network topology; a star network topology; a ring network topology; a repeater-based network topology; or a tiered-star network topology. Additional embodiments include a network 104 of mobile telephone networks that use a protocol to communicate among mobile devices, where the protocol is any one of the following: AMPS; TDMA; CDMA; GSM; GPRS UMTS; or any other protocol able to transmit data among mobile devices.

In various embodiments, the computing environment 101 includes more than one server 106A-106N such that the servers 106A-106N are logically grouped together into a server farm 106. In some embodiments, the server farm 106 includes servers 106 that are geographically dispersed and logically grouped together in a server farm 106, servers 106 that are located proximate to each other and logically grouped together in a server farm 106, or several virtual servers executing on physical servers. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 is administered as a single entity, while in other embodiments, the server farm 106 includes multiple server farms 106.

Figure 2:
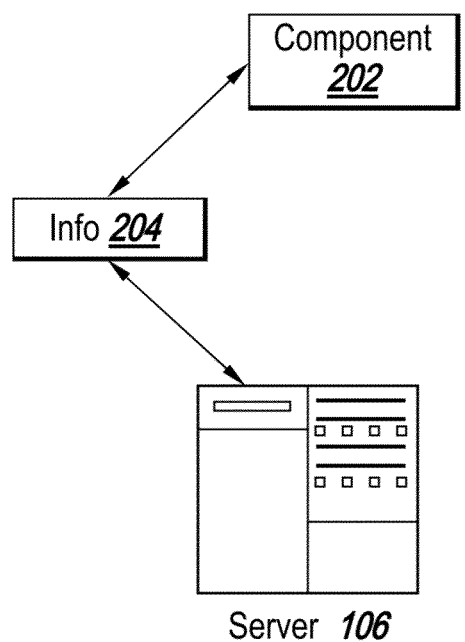
FIG. 2 is a schematic diagram of a system transferring information, in accordance with an embodiment of the present invention.

Referring now to FIG. 2, according to various embodiments of the invention, information 204 regarding a contextual search is transferred between the server(s) 106 and the component(s) 202. According to various embodiments, the component(s) 202 is computer software. According to other embodiments, the component(s) 202 is computer hardware or circuitry. According to various embodiments, the component(s) 202 is part of, or executes on, the client(s) 102. According to some embodiments, the component(s) 202 is part of, or executes on, the server(s) 106. According to various embodiments, information 204 is transferred to the server(s) 106 from the component(s) 202. According to various embodiments, information 204 is transferred to the component(s) from the server(s) 106. According to various embodiments, information 204 is transferred back and forth between the server(s) 106 and the component(s) 202.

Figure 3B:
FIGS. 3B and 3C are exemplary views of screen shots showing a webpage after contextual mode has been activated and various search terms are highlighted, according to some embodiments of the present invention.
Figure 3C:
Figure 3D:
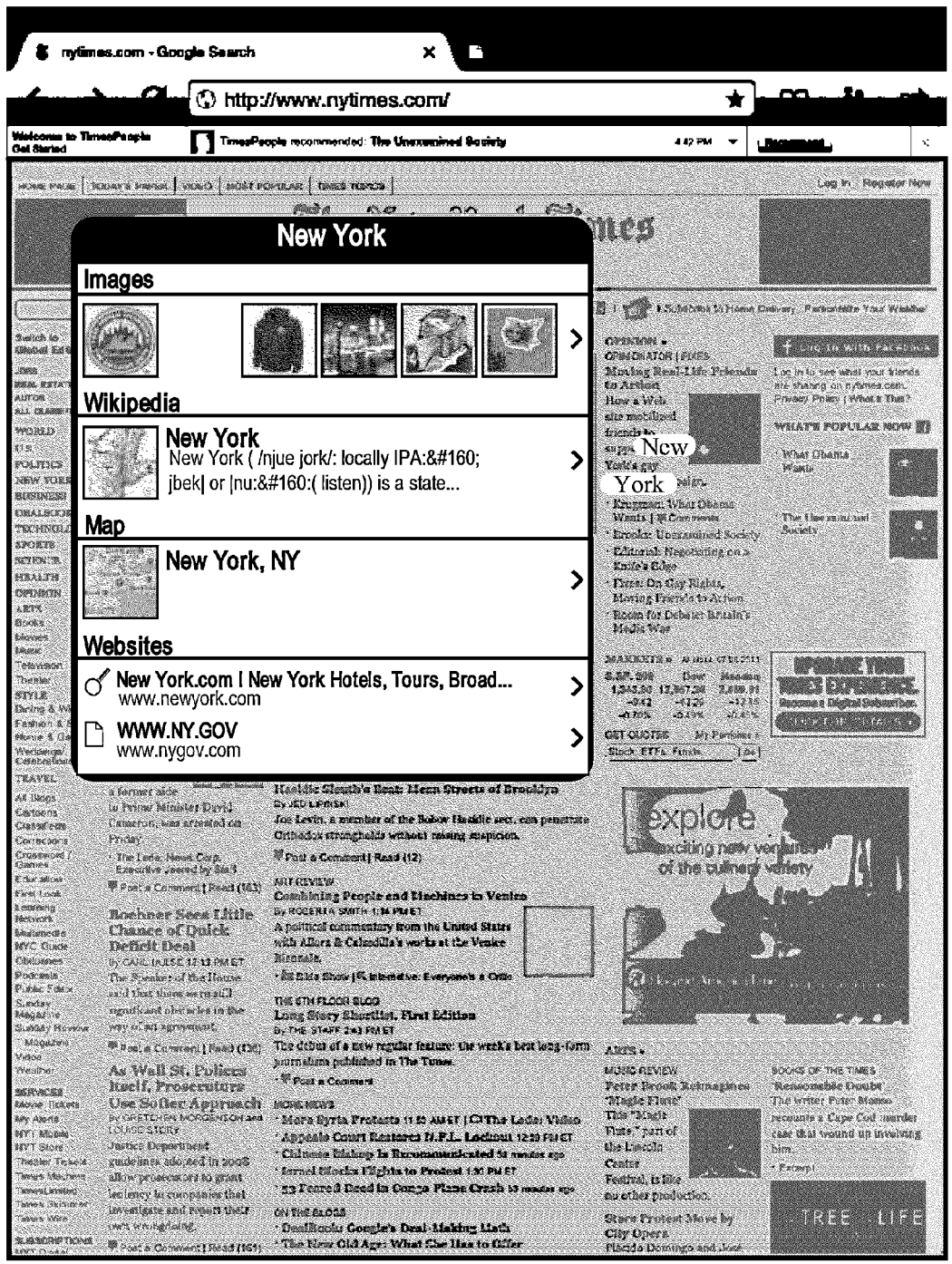
FIG. 3D is an exemplary view of a screen shot showing an overlay window and a webpage after a contextual search has been conducted, according to an embodiment of the present invention.

FIGS. 3A-D illustrate the user experience of the contextual search service according to a non-limiting, exemplary embodiment. In FIG. 3A, the user has navigated to a webpage in a web browser using a touch-screen tablet device. In FIG. 3B, contextual mode has been activated, and some search entities have been identified on the display by highlighting certain words on the underlying webpage. In FIG. 3C, the service has automatically highlighted certain words to notify the user that more information is available about those terms (although all the items, words, and objects on the webpage are selectable and searchable). In FIG. 3D, the words "New" and "York" are highlighted, to the right of the overlay window. Although those two words are on separate lines, the service determined that they were related by comparing those words with the context, and then highlighting them both on the display. A search was conducted, which returned the results displayed in the overlay window.

In another embodiment, the system does not require activation of contextual mode to allow a user to perform a search. In these embodiment, the user navigates to a web page, as shown in FIG. 3A and any word or series of words displayed by the web page is available for selection by the user. The user indicates a desire to search for additional information about a term, such as by a activating a specific mouse button or by executing a "long press" on a touch screen, and the term is highlighted in a manner similar to that shown in FIG. 3D. In some of these embodiments, the system will highlight entities that are recognized as potential search terms without input from the user. Selection of terms to automatically highlight can be based on prior use of the system by users (e.g. this term has been searched by multiple users recently) or can be based on other considerations (e.g. highlighting a currency denomination to educate the user that such a term can be searched).

Figure 4:
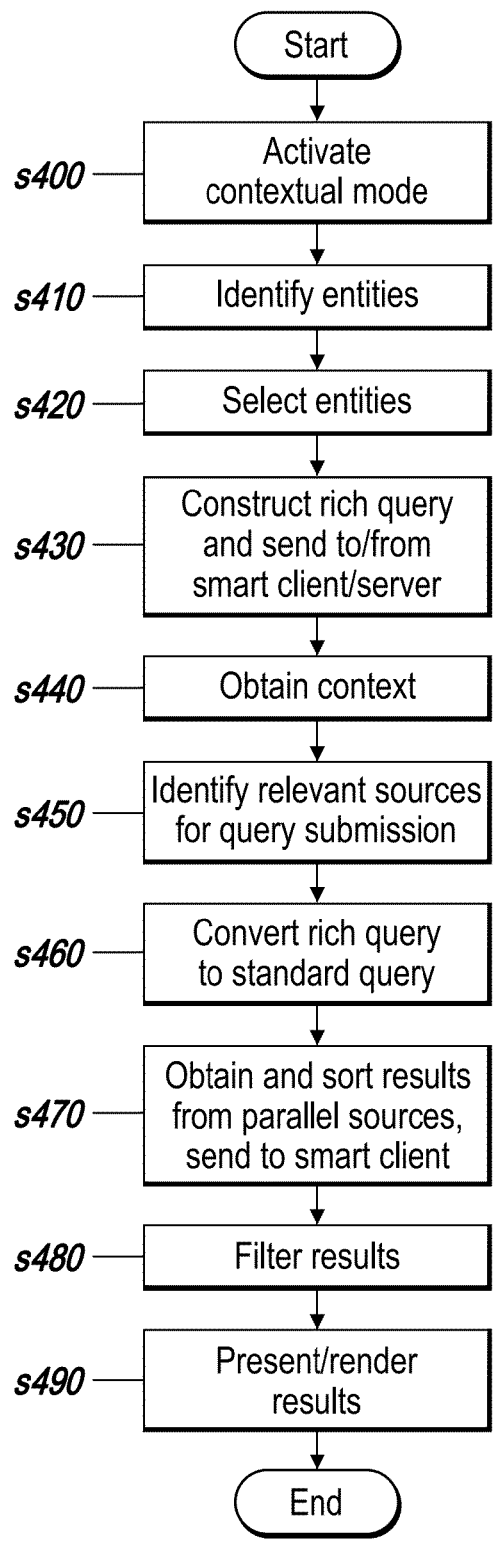
FIG. 4 is a flow diagram of a process according to an embodiment of the present invention.
Figure 5A:
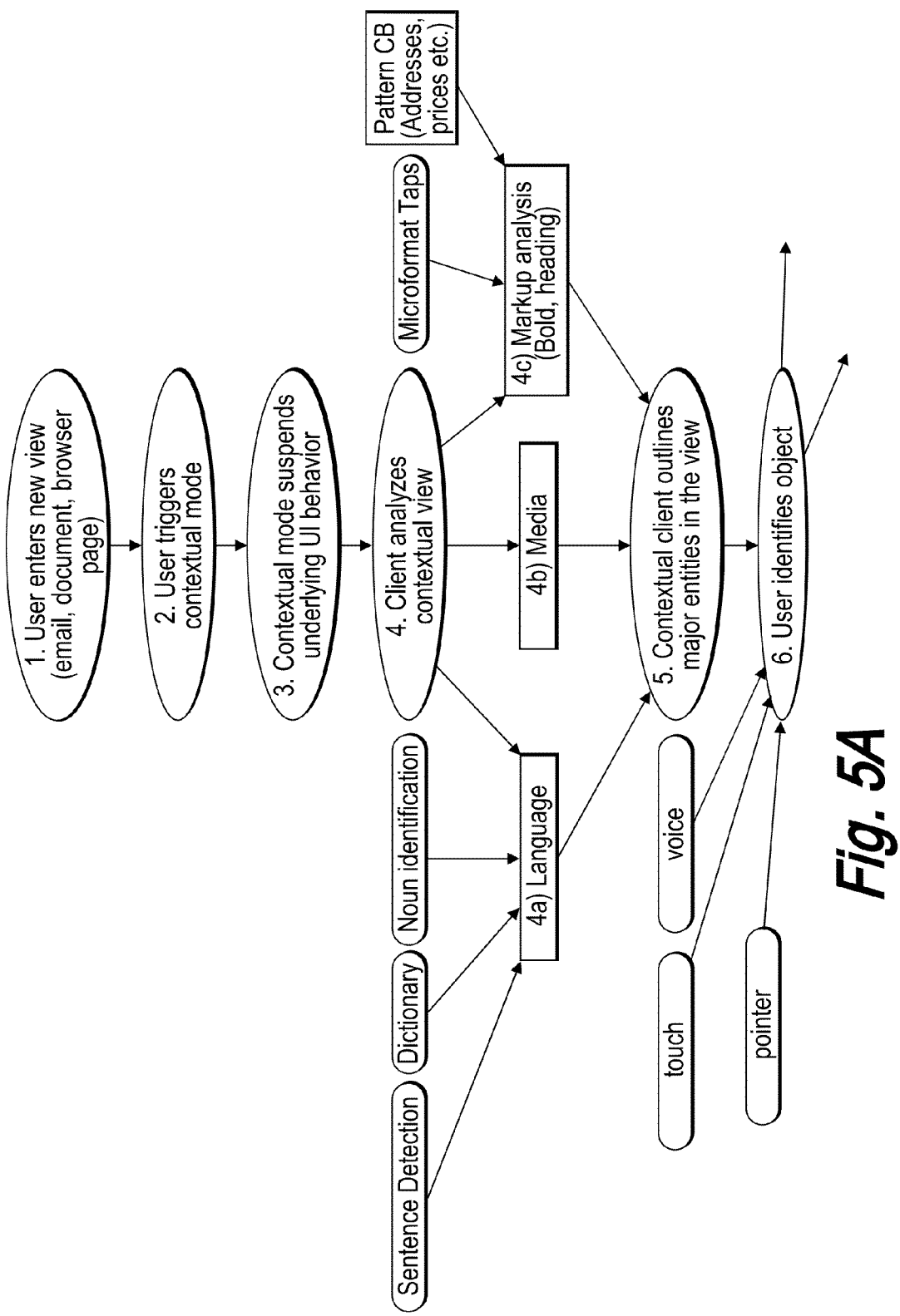
FIGS. 5A-5D are more detailed flow diagrams of a process according to an embodiment of the present invention.
Figure 5B:
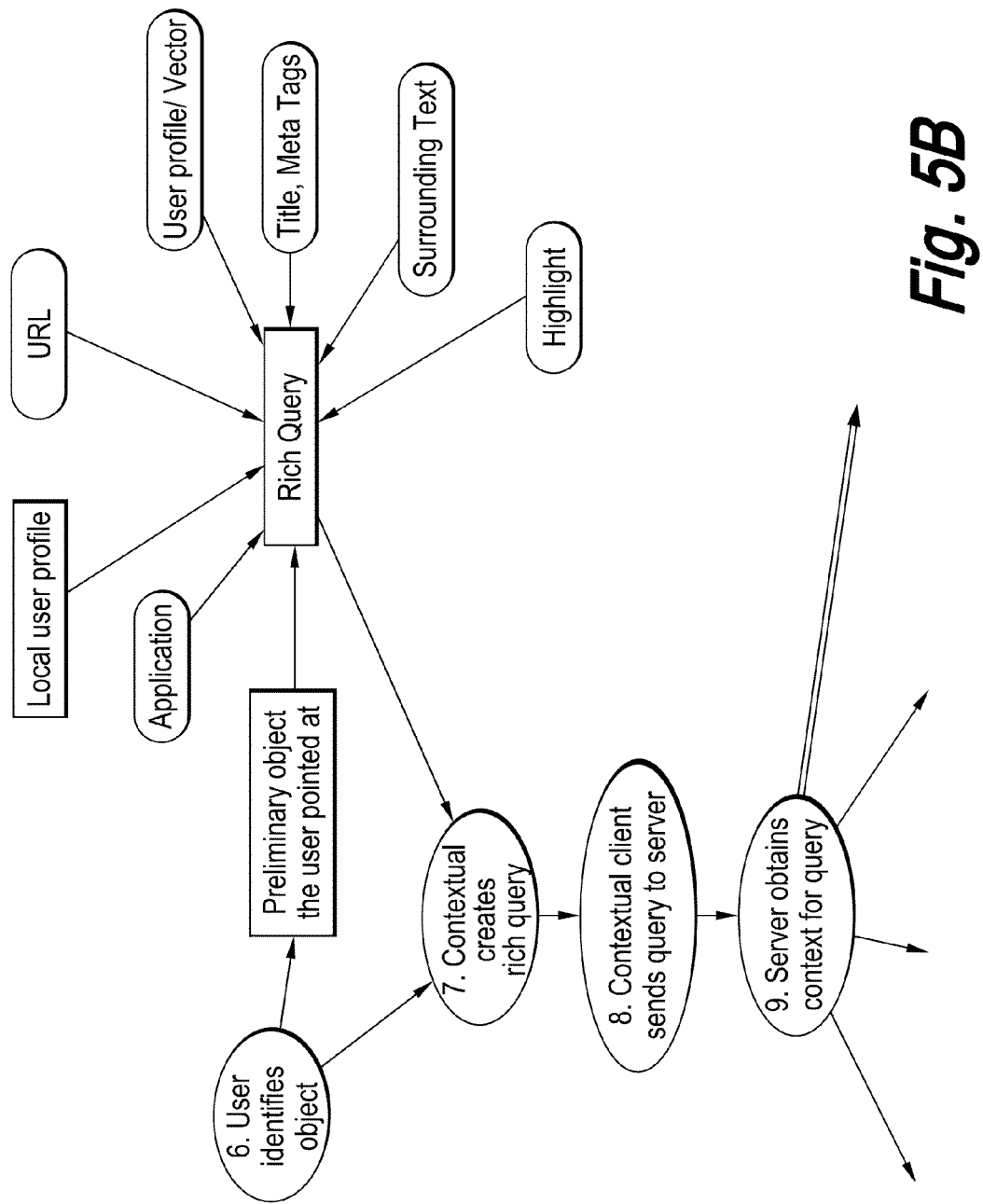
Figure 5C:
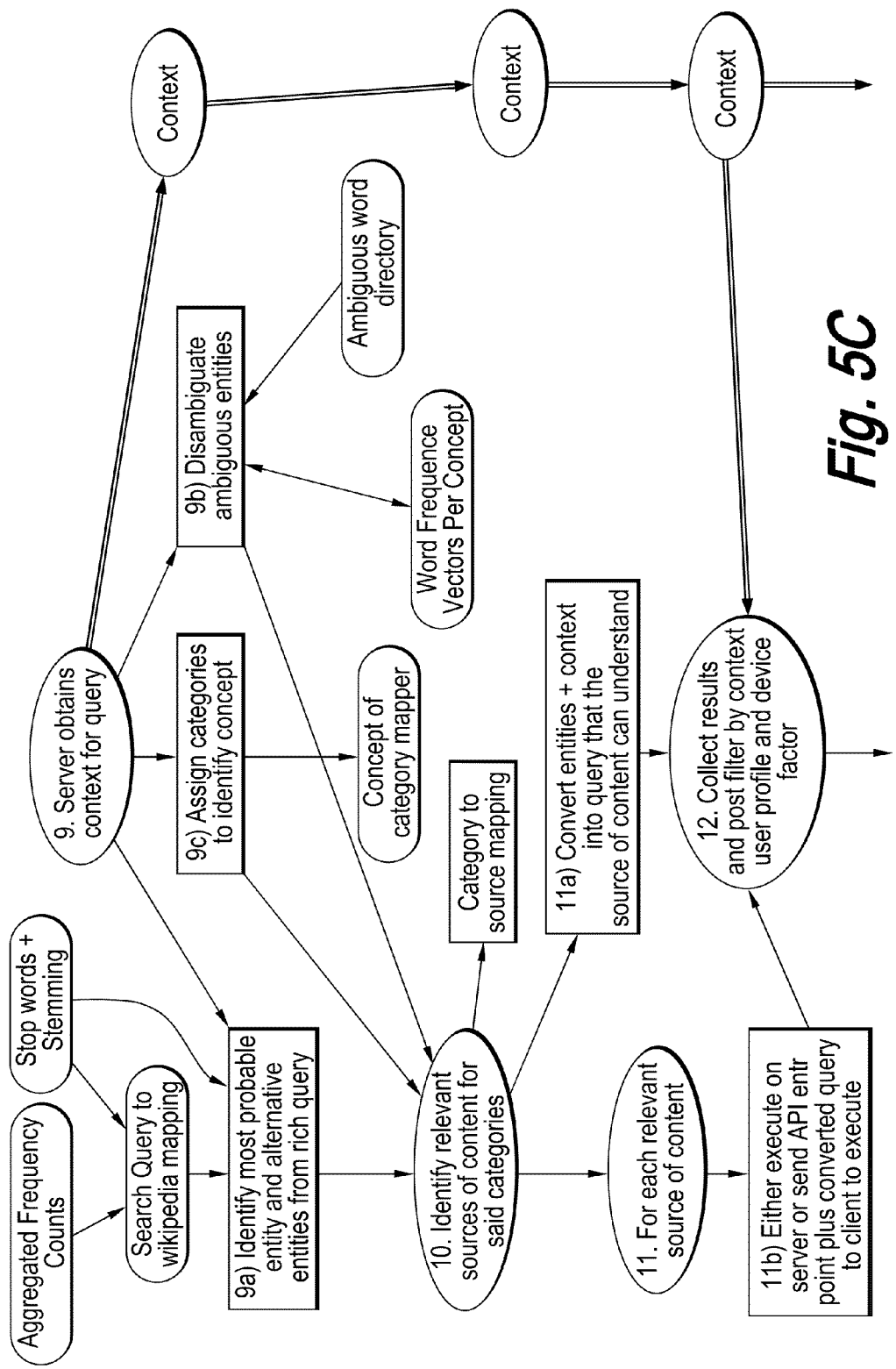
Figure 5D:
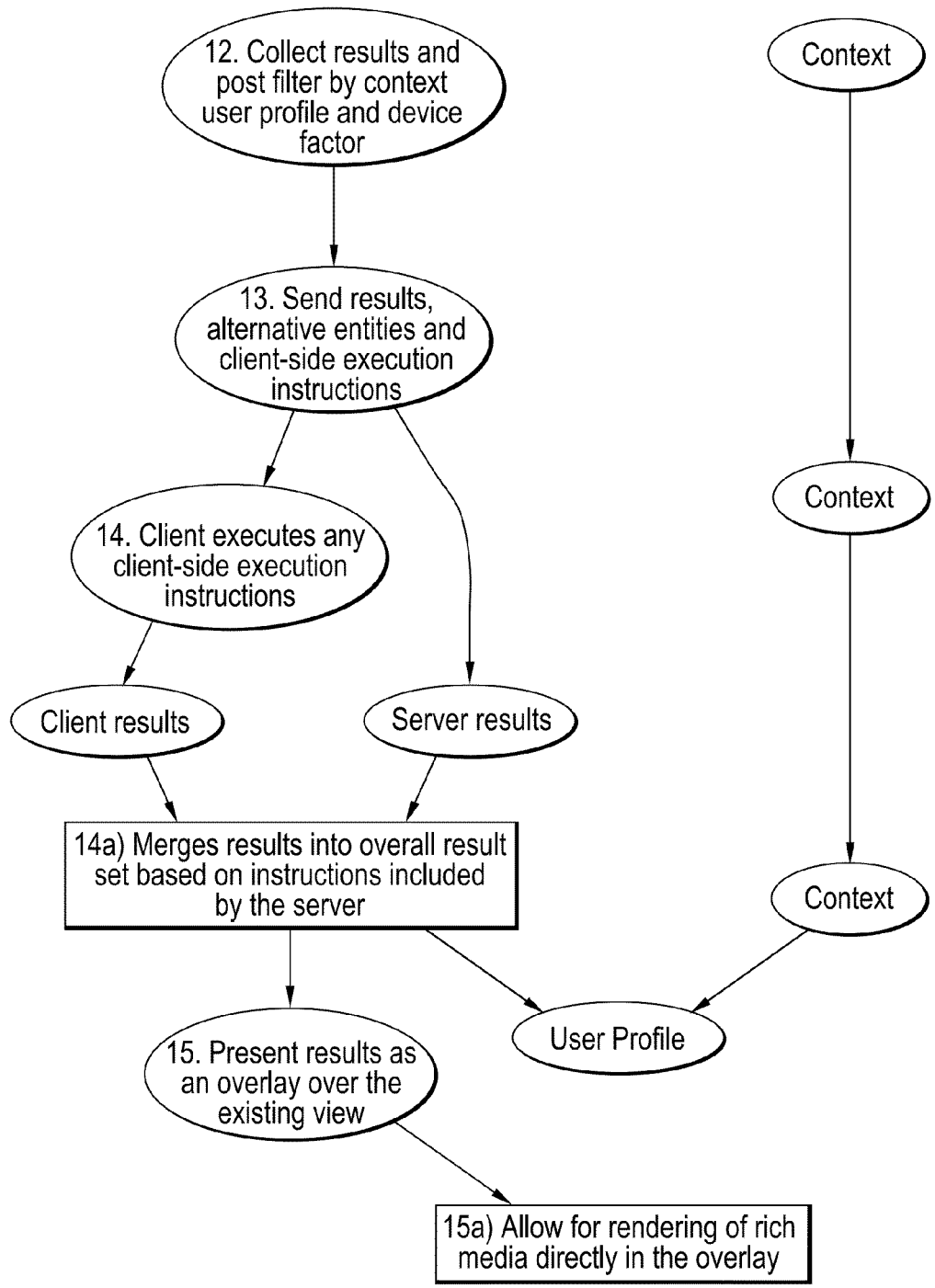

FIGS. 4 and 5A-5D show non-limiting processes for a contextual search service, according to various embodiments of the invention. Referring to FIG. 4, in step S400, according to some embodiments, the contextual searching mode is activated by a component(s) 202 before contextual searches can be performed. According to some embodiments, contextual searching mode is activated by the contextual search service accepting input, using a processor of a computing device, from the user to enable it. Examples include (but are not limited to), user input in the form of mouse input, touch-screen input, keyboard input, spoken command, or the like. For instance, in a non-limiting, exemplary embodiment, contextual searching mode is activated with a touch-screen device by receiving input corresponding with a sliding movement from the bottom of the screen. For another example, in a non-limiting, exemplary embodiment, contextual searching mode is activated by receiving input from a keyboard corresponding with a user pressing Alt (or a specific meta key). Once activated, according to some embodiments, the service indicates, using a display, audio device, or the like, that the contextual searching mode has been activated.

In still other embodiments, contextual mode is "always on," that is, it does not need to be activated in order for contextual searches to be performed. In these embodiments, the user selects a term to be searched by providing specific, predefined input such as the activation of a specific mouse button (e.g., right-clicking), the activation of a specific mouse button in combination with a specific key of a keyboard (e.g., control-click), or by providing a specific touch gesture, such as a double-finger press, triple-finger press or long press. In some embodiments, the user's finger must contact the screen for more than 500 milliseconds to register a long press. In other embodiments the length of time the user's finger's must contact the screen in order to register a long press is greater than 100 milliseconds, 300 milliseconds, 750 milliseconds, or 1000 milliseconds.

According to some embodiments, contextual searching mode is made persistent (that is, to stay on until it is turned off) when activated, or in some embodiments, is made optionally persistent by accepting input indicating that a user pressed a hotkey or otherwise indicated that the option was selected. According to further embodiments, contextual searching mode can be made non-persistent (when it would otherwise be persistent) by accepting input indicating that a user pressed a hotkey or otherwise indicated that that option was selected.

For some embodiments in which contextual mode is activated, entering contextual mode involves suspending the otherwise typical user interface behavior of the webpage browser, email client, or document viewer. For embodiments in which contextual mode is "always on," the activation of contextual searching suspends the normal behavior of the page. According to some embodiments, the ability of those software applications to accept input as normal may be suspended until the service is no longer in contextual mode. In that case, only the service will respond to user input directed at those applications unless the user input is directed at disabling the service or contextual mode. In these embodiments, user interaction events with the underlying page are intercepted and redirected or, in some case, discarded. For example, the following JavaScript event may be used to perform the interception of user interaction events: event.stopPropagation( ).

In a non-limiting, exemplary embodiment, a computer monitor may display the webpage shown in FIG. 7A in a browser window, where the word "JOBS" is hyperlinked. While not in contextual mode, clicking on "JOBS" would cause the browser to load the webpage specified by the hyperlink. While in contextual mode, clicking on "JOBS" would not cause the browser to load that webpage. Instead, "JOBS" would be highlighted by the service, indicating that "JOBS" is a search entity.

Returning to FIG. 4, in step S410, according to various embodiments, the contextual search service identifies at least one search entity. According to some embodiments, the search entity (or entities) is identified by the contextual search service accepting input, using a processor of a computing device, from the user to indicate search term(s). Examples include (but are not limited to), user input in the form of mouse input, touch-screen input, keyboard input, voice input, or the like. According to some embodiments, the service accepts input from a mouse corresponding with a user clicking on something. According to some embodiments, the service accepts input from a touch-screen device corresponding with a user touching, pointing, holding, releasing, making a dragging movement, or the like. In still other embodiments, the user may fine-tune the selection of a search term by providing additional input. For example, the user may drag the leading edge of a user interface element to indicate a desire to include in their selection a word or words immediately preceding the initially selected search term.

According to some embodiments, the contextual search service determines the search entity (or entities) at least in part through a disambiguation process, using a processor of a computing device. The disambiguation process itself also involves determining the local context in order to automatically select additional search terms or to determine the boundaries of the search entity (or entities). In some embodiments, the context is used to determine how often various combinations of potential terms are each searched. The frequency is then used, at least in part, to determine which additional search terms, if any, to select, beyond the one(s) indicated by the user. According to some embodiments, this disambiguation instead is performed by the server(s) 106 during step S440. According to some embodiments, disambiguation takes place both during steps S410 and S440.

For example, according to a non-limiting, exemplary embodiment, a touch-screen computer user highlights the word "Depp" while viewing a webpage about the movie, *The Pirates of the Caribbean*. The contextual search service takes as input the terms surrounding Depp, which were, "The actors included Johnny Depp, Keira Knightley, and Orlando Bloom." The service then determines that, for instance, "Johnny Depp" is a term that is searched for more often than "Depp, Keira". The service also determines that "Johnny Depp" is a more desirable search term than "Depp". Therefore, the service selects "Johnny Depp" as the search entity.

According to some embodiments, the contextual search service determines the local context by finding other term(s), collections of term(s), or the like, in proximity to those indicated by the user. According to some embodiments, such terms include (but are not limited to): postal addresses, email addresses, URLs (which may or may not correspond with a hypertext link), currency, phone numbers, geographic locations, or the like. In these embodiments, regular expressions may be used to determine the existence of these types of terms. Exemplary regular expressions include: address—[{regex:/[\t\r\n]*(.+[, \u00A0]{1,}[A-Z]{2}[\u00A0]?[\d{5})($|[\-\r\n]+)/}, {regex: /(\d+\w* [^\r\n,]+(?: Street|St|Avenue|Ave)(, \d+\w+Floor)?)/}]; currency—{code: 'USD', symbol: "$", name: 'dollars?'},{code: 'EUR', symbol: '€', name: 'euros?'},{code: 'GBP', symbol: '£', name: 'pounds?'}; Twitter handle—/^@[A-Za-z0-9_]+$/; and phone—[{regex: /([\d]{2}[\d]{2}[\d]{2}[\d]{2}[\d]{2})/},{regex: /([\d]{4}[\d]{4})/}, regex: /((\+[\d]+)?\(?[\d]{3}\)?[-][\d]{3}[-][\d]{4})/}].

According to some embodiments, search terms may be chosen based on whether the terms begin with a capital letter, are in all capital letters, or are in mixed case. According to some embodiments, such terms may be chosen from the beginning or end of a nearby sentence, where some embodiments take care to ignore periods that do not denote the end of a sentence (such as those used for abbreviations such as "U.S." or "Inc."). Some embodiments choose such terms based on the existence or non-existence of a nearby word "bridges" such as (but not limited to) the "of" in "the United States of America", apostrophes used to indicate possession ("Gerry's"), ampersands ("His & Hers"), and the like. In many embodiments this behavior is provided via a rule base containing commonly-used rules.

Some embodiments ignore terms that are common (for example, ignoring "more"). Some embodiments choose terms based on whether the surrounding HTML tag or other encoding denotes it with a special tag (for example, bold, italic, links, heading tags (<h1>, <h2>, <h3>), or the like). Some embodiments choose terms based on whether the parent node in a HTML or similar document is marked as a Microformat or special semantic tag. Some embodiments choose terms based on a Microformat where the Microformat consists of multiple parts (like an address), scan surrounding areas for the other related tags to highlight them at the same time. Some embodiments choose terms based on detected sentences, dictionary terms, nouns, or the like. Various embodiments choose terms based on any combination of the examples described above, or other similar examples.

In still further embodiments, every type of analysis described above is performed in order to identify search terms extant on a displayed page. In still other embodiments, various subsets of the identified techniques may be applied. For embodiments in which the client machine is resource constrained, such as a tablet or mobile phone, a restricted area is analyzed to conserve resources. For example, the following JavaScript may be used to determine if the device is a mobile device: navigator.userAgent.indexOf('mobile'). The rules and techniques may be applied independently of structural boundaries in the displayed page; for example, processing is not affected by text wrapping from one line to the next.

In step S420, according to various embodiments, the contextual search service notifies, using a processor, the user of the search entity (or entities) identified in step S410. According to some embodiments, the notification is visual, such as through a display of a computer device. In some embodiments, the search entity (or entities) is highlighted within a document on a display. In other embodiments, a copy of the selected area is magnified in order to help the user identify the selected entity. In still further embodiments, the document is overlaid with a layer to improve contrast of the selected entity, however that contrast is achieved. For example, in the embodiment shown in FIGS. 3A-3D, a darker layer is used to achieve contrast. In other embodiments, the text style of selected text is analyzed and the replicated with the color changed to black for best contrast; in an HTML document the font-style, font-family, font-weight, and text-transformation styles will be analyzed and replicated. Alternatively, these styles can be determined using the following JavaScript function: node.style.fontFamily.

In some embodiments, a pop-up window, text box, or the like is displayed to the user above the contrast layer (if provided), which may include a list of any search entities. According to some embodiments, the selected search entity (or entities) is the same as what was indicated by the user, so no additional notification is made. According to some embodiments, the service requests input from the user regarding which search entity to select. In some further embodiments, the service accepts inputs from the user indicating the user's selection. In some embodiments, the input indicates that the user pressed a key, touched a touch screen, pointed with a mouse, made a voice command, or otherwise indicated the user's selection.

In some other embodiments the selected search entity is an image, video, audio, or other non-textual entity. In these embodiments, a highlight is applied to the selected entity and it is brought to the foreground, for example, displayed on top of the contrast layer, if present.

According to some embodiments, the service has already selected the search entity, whether or not textual, and requests input from the user to confirm that the user wishes to conduct a search using that search entity.

In step S430, according to various embodiments, after a search entity is selected, that is, after the touch/click is registered and released, a query is a string constructed and posted to a server using a processor. According to various embodiments, the rich query string is a URL encoded so that it can be included in the body of a HTTP POST request. The rich query includes both the search entity and context information (hereinafter referred to as a "rich query"). According to some embodiments, the rich query includes context information which increases the likelihood of a relevant search. According to some non-limiting, exemplary embodiments, the context information includes any combination of the title of the page on which the entity is found (accessible using the JavaScript command, document.title), the URL of the page on which the entity is found (accessible using the JavaScript command document.location or, in some embodiments, read from native code using provided APIs), META tags, information regarding word frequencies, and/or the like, of the webpage where the search entity was found. Word frequencies may be calculated on the client and included in the HTTP POST request to the server. According to some embodiments, the context information includes any combination of the text that is located just before the search entity, the text that is located just after the search entity, the corresponding URL if hypertext tags surround the search entity, information (such as attributes) inside a parent tag surrounding the search entity, information regarding semantic tags surrounding the search entity, information regarding the application currently being executed (such as a web browser), information related to previous searches, information related to web pages visited, information related to hypertext links selected, information related to the user's profile, and/or the like.

Information about the application currently being executed may be exposed by an API provided by the operating system of the client. In some particular embodiments, the system is able to access the title of the window, or window name, in which the selected entity appears as well as the name of the executable application responsible for displaying the selected entity. Certain applications may allow access to further information. For example, an email program may also allow access to the title of the email, that is, the "subject" line and a word processing program may allow access to the title of the displayed document or to other characteristics of the document, such as word count.

Contextual information may be obtained by traversing the DOM tree to ascertain the node previous to the node containing the selected entity and extracting the content of the previous node and also to ascertain the node following the node containing the selected entity and extracting the content of the next node. Thus, in the following sentence: "Nicolas Sarkozy is the $23^{rd}$ President of the French Republic," in which $23^{rd}$ President has been selected, the text "Nicolas Sarkozy" will also be extracted and included the HTTP POST request. A similar technique may be used to ascertain text after the selected entity, i.e., in the sentence above the term "French Republic" may also be extracted and included in the HTTP POST request. In some embodiments, this technique is used until 25 characters before the selected entity are obtained, 25 characters after the selected entity are obtained, or both, in other embodiments it is used to obtain 50 characters before the selected entity are obtained, 50 characters after the selected entity are obtained, or both, in still other embodiments it is used to obtain 100 characters before the selected entity are obtained, 100 characters after the selected entity are obtained, or both and in still further embodiments it is used to obtain 250 characters before the selected entity are obtained, 250 characters after the selected entity are obtained, or both. Exemplary code for extracting the content from the previous node is as follows:

```
getPreviousTextNode: function(node) {
    var childs = node.parentNode.childNodes,
    idx = -1;
    for (var i=0; i<childs.length; i++) {
        if (childs[i] === node) {
            idx = i;
            break;
        }
    }
    if (idx > 0) {
        var pnode = childs[idx-1];
        while (pnode.childNodes.length > 0) {
            pnode = pnode.childNodes[pnode.childNodes.length-1];
        }
        return pnode;
    } else {
        return this.getPreviousTextNode(node.parentNode);
    }
}
```

Similarly, exemplary code for obtaining the content of the next node is as follows:

```
getNextTextNode: function(node) {
    if (!node || !node.parentNode) return null;
    var childs = node.parentNode.childNodes,
    idx = -1;
    for (var i=0; i<childs.length; i++) {
        if (childs[i] === node) {
            idx = i;
            break;
        }
    }
    if (idx < childs.length-1) {
        var pnode = childs[idx+1];
        while (pnode.childNodes.length > 0) {
            pnode = pnode.childNodes[0];
        }
        return pnode;
    } else {
        return this.getNextTextNode(node.parentNode);
    }
}
```

In some embodiments the selected entity is part of a hyperlink, or link. For example, using the example above, when selecting "23$^{rd}$ President" the user may actually be selecting the following HTML code:

```
<div>
    Nicolas Sarkozy is the
    <a href='http://www.presidents.fr' title='Presidents of France'>
        23rd President of the French Republic
    </a>
</div>
```

As described above, the selection of an entity will suspend normal processing by the page. Thus, rather than traversing the link identified by the text "23$^{rd}$ President," that selection will be intercepted and discarded. The system will then recognize, using the "A" HTML tag that the selected entity is a link and will then also extract from the HTML code helpful attributes from the link, such as the HREF, ALT and TITLE attributes, in the example above. These extracted attributes are included with the selected entity in the HTTP POST request. The system may further use the JavaScript command "element.getattribute( )" in order to acquire the attributes of a tag.

In still other embodiments, the system may acquire text associated with headers from the page on which the selected entity appears using the JavaScript command "document.querySelectorAll('h1,h2,h3,h4,h5,h6,h7.h8')". The acquired text is then included in the HTTP POST request sent to the server. The system may also search the DOM of the web page to identify META tags. The text associated with META tags may also be useful. Each of the META tags in a document will be returned by the following command: document.getElementsByTagName('meta') and each returned tag may be analyzed using the following exemplary code:

```
for(i = 0; i < metas.length; i++) {
    if(metas[i].name == 'keywords'){
        richQuery['keywords'] = metas[i].content;
    }
}
```

According to a non-limiting, exemplary embodiment, FIG. 7A shows a sample webpage and FIG. 7B shows a corresponding rich-query string. The user has highlighted "132 Crosby Street, 4$^{th}$ Floor New York, N.Y. 10012", which is used as the search entity. The rich-query string includes the name of the server ("query-server-beta"), the data type ("JSON"), a requested layout type ("default"), a return type ("javascript"), a language or culture specifier ("en-US"), and the URL of the search entity's webpage ("http://kikin.com/contact"). Additionally, the rich-query string includes information found on the search entity's webpage, including an address ("132 Crosby Street, 4th Floor, New York, N.Y. 10012"), text in close proximity to the address ("kikin Headquarters"), a phone number ("646-395-1280"), prominent text ("Contact Us"), and keywords specified in the META tags ("kikin, facebook, twitter, social networking, price comparison, browser plugin").

In another embodiment, information about the HTML hierarchy of the page on which the selected entity is found may be used to determine content. In the example above, the HTML code for displaying the address to the user may be:

```
<div id='address'>
    Our address:
    <address>
        132 crosby street, New York, NY 10012
    </address>
</div>
```

In these embodiments selecting "New York" will cause the system to traverse the DOM model for the page and detect that the selected entity is part of an ADDRESS tag and a DIV tag. The extracted hierarchal information is included in the HTTP POST request sent to the server.

In still other embodiments, the system may identify entities using microformats, when available. Microformats are attributes of HTML elements that store extra information, not visible to the user, about a tag. For example:

```
<p itemprop="address" itemscope=""
itemtype="http://data-vocabulary.org/Address">
    <span itemprop="stress-address">2 Lincoln Place</span>,
    <span itemprop="locality">
        Brooklyn
    </span>
    <span itemprop="region">
        NY
    </span>
</p>
```

In the example above if the user selects "Brooklyn," the system will detect the presence of the property "itemprop" and parse the DOM tree to tag the selection as an address. If a microformat is identified, it is saved and included in the HTTP POST request to the server.

According to various embodiments, information related the user's profile may also be used when formulating a rich query for transmission to the server. Such information includes, but is not limited to, any combination of the user's history of documents visited, favorite websites or bookmarks, categories of favorite websites or bookmarks, shares, prior searches, recent prior searches, the search that referred the user to the current webpage, saves, interests, social networks, frequently accessed applications/documents/websites, a Bloom filter data structure that represents all domains that the user visited during a specific period of time, a Bloom filter data structure that represents all domains from which the user saved a webpage, a Bloom filter data structure that represents all domains on which the user shared a webpage, or the like. According to a non-limiting, exemplary embodiment, FIG. 6 shows a textual representation of a data structure containing information regarding a sample user profile.

Prior searches performed by the user are stored and may be used as part of the user profile. Additionally, as the user visits web pages, the URLs of those web pages are recorded and sent to the server. For example, is a user searches www.google.com for "new camera" and then visits multiple web pages about cameras, that search and the pages visited by the user will be sent to the server and used to refine a contextual query to direct it more towards camera-related results.

Similarly, the bookmarks saved by a user during web browsing are accessed and sent to the server to be used to refine a contextual search. For example, if a user has bookmarked google.com, bbc.com/news, and cnn.com, the server may use this fact to provide more news-related sites in response to a request.

According to various embodiments, after the rich query is constructed, this rich query is sent, using a processor, from the component(s) 202 to the server(s) 106. According to some embodiments, more than one rich query may be constructed and sent. According to further embodiments, the rich queries may be identical, and in other embodiments, at least some of the rich queries may be at least partially different from another rich query. According to various embodiments, the processor sends the rich query (or queries) to the server(s) 106 using a networking device. According to some embodiments, the rich query is not sent to a server and is instead processed on the client 102 by the component(s) 202 Alternatively, the rich query may be both sent to the server(s) 106 by the client and processed locally by component(s) 202. According to further embodiments, no rich query is constructed, and instead the contextual information that would have otherwise been used for a rich query is sent to the server(s) 106, processed directly by the component(s) 202, or both.

In step S440, according to various embodiments, the contextual search service, using a processor, obtains the context from the rich query (or queries) it receives from the component(s) 202. According to some embodiments, the service preprocesses the attributes stored in the rich query (or queries) to identify context that is potentially useful to improve search results. According to some embodiments, the service categorizes the search entity (or entities) based on the context information stored in the search query (or queries). According to some embodiments, the service disambiguates the meaning of any ambiguous terms with the help of the context information. The service may also leverage the results obtained by other users of the service to further refine the results given to any particular user.

For embodiments in which the selected entity is an image, the image is submitted to a facial recognition service to identify the pictured person or product. The result from that conversion, which is text, is then used by the service as the selected entity to search. For embodiments in which the selected entity is audio, a digital fingerprint of the audio is submitted to an audio recognition service, such as services offered by Rovi Shazam and IntoNow. In some embodiments, the audio fingerprint that is submitted to the audio recognition service is generated by executing a hash on the PCM data comprising the file. The result returned from the audio recognition service, which is text, is then used as the selected entity to search.

For embodiments in which the selected entity is textual, the server identifies a most probable sequence of words based on the selected text and the surrounding text. In one embodiment, the server accomplishes this by generating a list of n-word-grams. In some embodiments, the number words used to create the word grams are 10 words, in other embodiments 8 words are used, in still other embodiments 6 words are used, in still further embodiments 4 words are used and in still other embodiments 2 words are used.

As an example of this, for the sentence:

Tunisia, the country where the Arab Spring uprisings began this year, has joined the International Criminal court, becoming the first North African country to do so in which "International Criminal" was the selected text would result, in an embodiment in which 6 words are used, in the following set of word-grams:
this year has joined the international
year has joined the international criminal
has joined the international criminal court
joined the international criminal court becoming
the international criminal court becoming the
international criminal court becoming the first
criminal court becoming the first north
year has joined the international
has joined the international criminal
joined the international criminal court
the international criminal court becoming
international criminal court becoming the
criminal court becoming the first
has joined the international
joined the international criminal
the international criminal court
international criminal court becoming
criminal court becoming the
joined the international
the international criminal
international criminal court
criminal court becoming
the international
international criminal
criminal court
international
criminal In some embodiments, each of the generated word-grams may be used as input to a search engine, such as google.com, bing.com, yahoo.com and the like. The results returned from these searches can be reviewed to determine if any of the results contain links to a knowledge management site, such as wikipedia.com. Word-grams that returned search results having links to a knowledge management site are then ordered from most popular to least popular. The longest word-gram returning the most popular search is selected as the intended search term.

The selected search term may then be reviewed to determine if the word or word sequence has multiple meanings. In one embodiment, this is accomplished by consulting a directory of ambiguous phrases, such as that maintained by wikipedia.com. In this embodiment, if the phrase is ambiguous, compare the text of the page where the user originally selected the text, with the text on each page that is linked from the disambiguation page. Select the page with the most significant overlap and adjust the highlight text based on this. In a specific example, for the following text: https://www.apple-bank.com/about.aspx when the user highlights "Apple," a request is made to a disambiguation page, e.g., http://en.wikipedia.org/wiki/Apple_(disambiguation). The text on the about page is compared with each page linked from above disambiguation page. Because words used on http://en.wikipedia.org/wiki/Apple_Bank overlap more than with the other pages, e.g., 1863 (the year the bank was incorporated), $125^{th}$ (the street the first branch was located on), mortgage, financial, or New York, Apple Bank is selected as the disambiguated search term to use going forward.

In step S450, according to various embodiments, the contextual search service, using a processor, identifies relevant content source(s) for query submission. Content sources include, but are not limited to, the Internet, specific commerce, travel, or other service-related sources, knowledge sources such as Wikipedia and Wolfram Alpha, proprietary sources such as corporate databases, and the like. According to various embodiments, the contextual information determined in step S440 is used to determine which content source(s) is (or are) relevant. For example, according to some non-limiting exemplary embodiments, rich queries which appear to relate to travel destinations (according to the search entity and its context) will be matched by the service to the Internet and travel-related sources. According to some embodiments, the content source(s) is (or are) determined based at least in part on the type of media that the rich query seems to be related to, for example, videos, photos, etc. According to some embodiments, the content source(s) is (or are) determined based at least in part on the ontological category that the rich query seems to be related to, for example, commerce, travel, etc. According to some embodiments, preferences indicated by the user and received by the service determine, in part, the type of content source(s).

In more detail, step S450 may be performed by searching groupings of content sources, referred to herein as "vertical categories." In general, the disambiguated word or word sequence is used to return general search results which are then, in turn, compared to a vertical category mapping directory to identify potentially relevant content sources. In some embodiments, the vertical categories may be selected or prioritized based on, for example, context-specific skew or user preferences.

A specific example of this process is how content sources are selected for a general search term, such as "Hawaii." A general search for "Hawaii" may return, for example, the following results:
1. www.gohawaii.com
2. www.gohawaii.com/big-island
3. Map of Hawaii
4. hawaii.gov/
5. www.capitol.hawaii.gov/session2011/
6. Images for Hawaii
7. en.wikipedia.org/wiki/Hawaii
8. www.co.hawaii.hi.us/
9. www.lonelyplanet.com/usa/hawaii A URL prefix to category index contains the categorization for "Map→Map", "Images→Images", "Wikipedia→References", and "Lonely Planet→Travel". Based on these results, the serve selects the following vertical categorization: Map, Images, References, and Travel. In one embodiment, for each domain, the verticals most frequently accessed by the user are tracked. That is, for example, if people on lonelyplanet.com happen to view more Images then Maps, then images will be prioritized over maps for all users in future searches associated with lonelyplanet.com. However if a specific user watches videos with greater frequency than the general population, the video category will be introduced (or boosted) only for that user.

In step S460, according to various embodiments, the contextual search service, using a processor, converts the rich query (or queries) to a standard query (or queries). Standard queries are queries that are acceptable as input to the content source(s) identified in step S450. According to various embodiments, a standard query includes one or more search entities. According to various embodiments, a standard query additionally includes context information related to the search entity. According to some embodiments, if during step S440, the service disambiguated the meaning of any ambiguous terms with the help of the contextual information, additional terms may be included in the standard query, as determined by the disambiguation process. According to some embodiments, Boolean logic is applied to standard query construction. In a non-limiting embodiment, for example, Boolean logic is used in constructing a standard query for an Internet Search source which accepts Boolean search queries.

According to some embodiments, unnecessary words in the search entity are not included in the standard query. For example, if the search entity is long, the search entity may be shortened for the standard query, to increase the diversity of results. This is because search strings that are too specific may return results from too narrow a list of sources.

In greater detail, for each vertical source identified, a query string is created that can be understood by the context source. In some embodiments, each vertical source has an associated input and output mapping, which translates a rich query received from a client into specific instructions for the content source. For example, to search YouTube the following query instruction may be generated:

http://gdata.youtube.com/feeds/api/videos?q={QUERY}&orderby=relevance&safeSearch=moderate&max-results=20&format=5&v=2&client=ytapi-kikin-Youtubevideowidg-s7nshfa6-0&lr={LANGUAGE}

The placeholders {QUERY} and {LANGUAGE} would be populated based on the rich query. YouTube results may be mapped in the following manner:
feed/entries/title→title
feed/entries/links/href→link
feed/entries/mediaGroup/thumbnails→thumbnail in order to return result that can be used by the service. In some embodiments, all content sources are accessed in parallel and the results of each source are post-filtered and re-ordered.

In step S470, according to various embodiments, the contextual search service, using a processor, obtains results from the content source(s). According to various embodiments, the results are obtained by submitting the standard query (or queries) that were constructed in step S460 to the content source(s) identified in step S450, and the service then accepts results from one or more of the content source(s). According to various embodiments, the results are processed. According to some embodiments, the results are sorted to remove duplicates (for example, sending results to multiple content sources may return results from one content source that duplicate one or more of the results from another content source). According to some embodiments, the results are sorted in order of contextual relevance. According to various embodiments, the results or processed results are sent to the component(s) 202 by a processor, using a networking device.

According to a non-limiting, exemplary embodiment, FIG. 7C shows a textual representation of a data structure containing sample results returned by a server that had been provided the rich query string of FIG. 7B. The search entity was "132 Crosby Street, 4th Floor New York, N.Y. 10012". Information regarding the user's profile included a country code, IP address, country, region, city, DMA code, region, area code, postal code, continent code, latitude and longitude. The results included map information regarding address provided in the search entity (latitude, longitude, and postal address). The results further included a website related to the location of the address provided in the search entity (the local government website).

Returning to FIG. 4, in step S480, according to various embodiments, the contextual search service, using a processor, filters the results. According to some embodiments, the results are filtered according to settings received from the user or stored in a user profile. According to some embodiments, the results are filtered according to the physical limitations of the device of the components (202), for example, the device screen size, latency, and/or caching.

In greater detail, the results of all content source searched may be merged based on the order of the vertical categories and the merged results may be sent to the client. In some embodiments, the results are sent to client together with client-side query descriptors. In some specific embodiments, the search results are sent to the client in a JSON-encoded structure.

In step S490, according to various embodiments, the contextual search service, using a processor, presents the results. According to various embodiments, presenting the results involves rendering the results on a display. According to some embodiments, the service accepts input from the user to update the search entity so that a new search may be conducted. According to some embodiments, the results are displayed in a pop-up window, dialogue box, unopened or opened tab, overlay, or the like. According to some embodiments, the results are displayed in text form and/or rich media form, including images, videos, maps, and/or the like. In still other embodiments, the server provides the query translation to the client and the client itself executes the query.

In some embodiments, the client may itself perform the same series of steps described above, either independently or in parallel. For example, the client may execute parallel queries of content sources and merge those results into the results received from the server. For these embodiments, the client follows the same query logic as that described above in connection with the server. In certain embodiments, the results from the server may be used to update or adjust the selected entity. In these embodiments, the updated or adjusted selected entity may be searched, as described above.

Having described certain embodiments of an apparatus for interacting with software, it will now become apparent to one of skill in the art that other embodiments incorporating the concepts of the disclosure may be used.

What is claimed:

1. A method for providing contextual information regarding semantic entities included in a page of content, the method comprising:
    displaying, on a display device, to a user a web page of content including one or more semantic entities and having an interface behavior;
    identifying, by a processor, a first word and a second word included in the web page of content as comprising a semantic entity based on the search frequency of a first word and a second word in combination, wherein the identifying further includes one of (1) determining a local context to determine the boundary of the semantic entity, or (2) determining an evaluation of the capitalization of words in the web page of content;
    receiving input from the user indicating a desire to receive contextual information regarding the identified one or more semantic entity;
    entering a contextual mode and automatically suspending the interface behavior of the web page of content;
    receiving contextual information associated with the identified semantic entity; and
    displaying to the user the received contextual information.

2. The method of claim 1, further comprising highlighting the identified semantic entity.

3. The method of claim 1, wherein the received user input is received in the form of touch-screen input.

4. The method of claim 1, further comprising suspending the user interface behavior of the displayed web page in response to user input comprising a dragging movement.

5. The method of claim 1, wherein identifying the semantic entity includes determining that the frequency with which a combination of words is searched exceeds a pre-determined threshold.

6. The method of claim 1, wherein identifying the semantic entity includes determining the existence of an HTML tag in the web page.

7. A system for providing contextual information regarding semantic entities included in a page of content, the system comprising:
    a processor coupled to a non-transitory computer readable medium, the computer readable medium storing processor executable instructions that when executed by the processor cause the processor to:
    display, on a display device, to a user a web page of content including one or more semantic entities, wherein the web page having an interface behavior;
    identify a first word and a second word included in the web page of content as comprising semantic entity based on the search frequency of a first word and a second word in combination; and
    identify the semantic entity further based on (1) determining a local context to determine the boundary of the semantic entity, or (2) determining evaluating capitalization of words in the web page of content; and
    receive input from the user indicating a desire to receive contextual information regarding of the identified semantic entity;
    enter a contextual mode and automatically suspend the interface behavior of the web page of content;
    receive contextual information associated with the one of the identified semantic entity; and
    display to the user the received contextual information.

8. The system of claim 7, wherein execution of the processor executable instructions further causes the processor to highlight the identified semantic entity.

9. The system of claim 7, wherein the processor receives input in the form of touch-screen input.

10. The system of claim 7, wherein execution of the processor executable instructions further causes the processor to suspend the user interface behavior of the displayed web page in response to user input comprising a dragging movement.

11. The system of claim 7, wherein execution of the processor executable instructions further causes the processor to identify the semantic entity by determining that the frequency with which a combination of words is searched exceeds a pre-determined threshold.

12. The system of claim 7, wherein execution of the processor executable instructions further causes the processor to identify the semantic entity by determining the existence of an HTML tag in the web page.

13. The method of claim 1, further comprising constructing a query corresponding to the identified one or more semantic entities.

14. The method of claim 13, further comprising submitting the query corresponding to the identified one or more semantic entities to a plurality of search sources.

15. The method of claim 1, wherein receiving contextual information associated with the one of the identified one or more semantic entities further comprises receiving the contextual information from a plurality of search sources.

16. The method of claim 15, further comprising prioritizing the contextual information received from the plurality of search sources.

17. The system of claim 7, wherein execution of the processor executable instructions further causes the processor to construct a query corresponding to the identified one or more semantic entities.

18. The system of claim 17, wherein execution of the processor executable instructions further causes the processor to submit the query corresponding to the identified one or more semantic entities to a plurality of search sources.

19. The system of claim 7, wherein processor is further configured to receive the contextual information from a plurality of search sources.

20. The system of claim 19, wherein execution of the processor executable instructions further causes the processor to prioritize the contextual information received from the plurality of search sources.

\* \* \* \* \*